United States Patent
Ehrenberg

(10) Patent No.: US 10,285,395 B1
(45) Date of Patent: May 14, 2019

(54) MESH LID SYSTEM FOR A GARBAGE CAN

(71) Applicant: Vince Ehrenberg, Chicago, IL (US)

(72) Inventor: Vince Ehrenberg, Chicago, IL (US)

(*) Notice: Subject to any disclaimer, the term of this patent is extended or adjusted under 35 U.S.C. 154(b) by 207 days.

(21) Appl. No.: 15/484,246

(22) Filed: Apr. 11, 2017

(51) Int. Cl.
  *B65F 1/16* (2006.01)
  *A01M 29/30* (2011.01)

(52) U.S. Cl.
  CPC ........... *A01M 29/30* (2013.01); *B65F 1/1615* (2013.01); *B65F 1/1646* (2013.01); *B65F 2210/148* (2013.01)

(58) Field of Classification Search
  CPC ..... A01M 29/30; B65F 1/1615; B65F 1/1646; B65F 2210/148
  USPC .............. 220/318, 729, 730, 908.1
  See application file for complete search history.

(56) References Cited

U.S. PATENT DOCUMENTS

| | | | |
|---|---|---|---|
| 3,291,515 A * | 12/1966 | Lierman | B65D 45/02 220/318 |
| 4,203,479 A | 5/1980 | Mathews | |
| 4,832,222 A | 5/1989 | Storton | |
| 5,031,796 A | 7/1991 | Schafer | |
| 6,062,412 A * | 5/2000 | Jacobsmeyer, Jr. | B65F 1/16 150/154 |
| D432,668 S | 10/2000 | Lilie | |
| 6,311,859 B1 | 11/2001 | Haas | |
| 6,341,713 B1 * | 1/2002 | Kilmer | B65F 1/14 150/154 |
| 7,086,557 B2 | 8/2006 | Miller | |
| 7,866,679 B1 | 1/2011 | Leon | |
| 2002/0167000 A1 * | 11/2002 | McKay | A01K 3/00 256/59 |
| 2003/0160050 A1 * | 8/2003 | Carter | B65F 1/0006 220/9.1 |
| 2005/0061824 A1 * | 3/2005 | Miller | B65F 1/16 220/836 |
| 2007/0090114 A1 * | 4/2007 | Rouns | B65F 1/1615 220/326 |
| 2008/0163965 A1 * | 7/2008 | McNelly | B65D 77/0406 150/165 |
| 2010/0212597 A1 | 8/2010 | Wolfe | |
| 2014/0325805 A1 * | 11/2014 | Troiano | F16B 45/04 24/600.5 |
| 2016/0107836 A1 * | 4/2016 | Kirby | B65F 1/14 150/154 |
| 2016/0137370 A1 * | 5/2016 | Won | B60J 11/04 150/166 |
| 2017/0320667 A1 * | 11/2017 | Stone | B65F 1/1615 |
| 2018/0057254 A1 * | 3/2018 | Lawyer | B65F 1/06 |

FOREIGN PATENT DOCUMENTS

CA    2627207 A1    9/2009

* cited by examiner

*Primary Examiner* — James N Smalley

(57) ABSTRACT

The mesh lid system for a garbage can is a protective system for garbage cans. It provides a barrier between the garbage can and the animals on the lid of the can and around the bottom of the can—two areas that are the most likely to be targeted by animals. It also prevents the lid from being opened by the animals. The barrier is made of a metal mesh material. The lid is kept closed by one or more bungee cords that may be attached to the metal mesh material and other parts of the garbage can.

9 Claims, 6 Drawing Sheets

MESH LID SYSTEM FOR A GARBAGE CAN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of trash cans, more specifically, a mesh lid system for a garbage can.

In some areas garbage cans (also known as trash cans and waste containers) are susceptible to damage from animals such as rodents, squirrels, and dogs. The animals may try to enter the garbage can and remove its contents, knock that garbage can over, or gnaw holes in the can.

SUMMARY OF INVENTION

The mesh lid system for a garbage can is a protective system for garbage cans. It provides a barrier between the garbage can and the animals on the lid of the can and around the bottom of the can—two areas that are the most likely to be targeted by animals. It also prevents the lid from being opened by the animals. The barrier is made of a metal mesh material. The lid is kept closed by one or more bungee cords that may be attached to the metal mesh material and other parts of the garbage can.

An object of the invention is to protect a garbage can from damage caused by an animal gnawing on the garbage can.

A further object of the invention is to keep the lid of a garbage can closed when an animal attempts to open the lid.

These together with additional objects, features and advantages of the mesh lid system for a garbage can will be readily apparent to those of ordinary skill in the art upon reading the following detailed description of the presently preferred, but nonetheless illustrative, embodiments when taken in conjunction with the accompanying drawings.

In this respect, before explaining the current embodiments of the mesh lid system for a garbage can in detail, it is to be understood that the mesh lid system for a garbage can is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mesh lid system for a garbage can.

It is therefore important that the claims be regarded as including such equivalent construction insofar as they do not depart from the spirit and scope of the mesh lid system for a garbage can. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
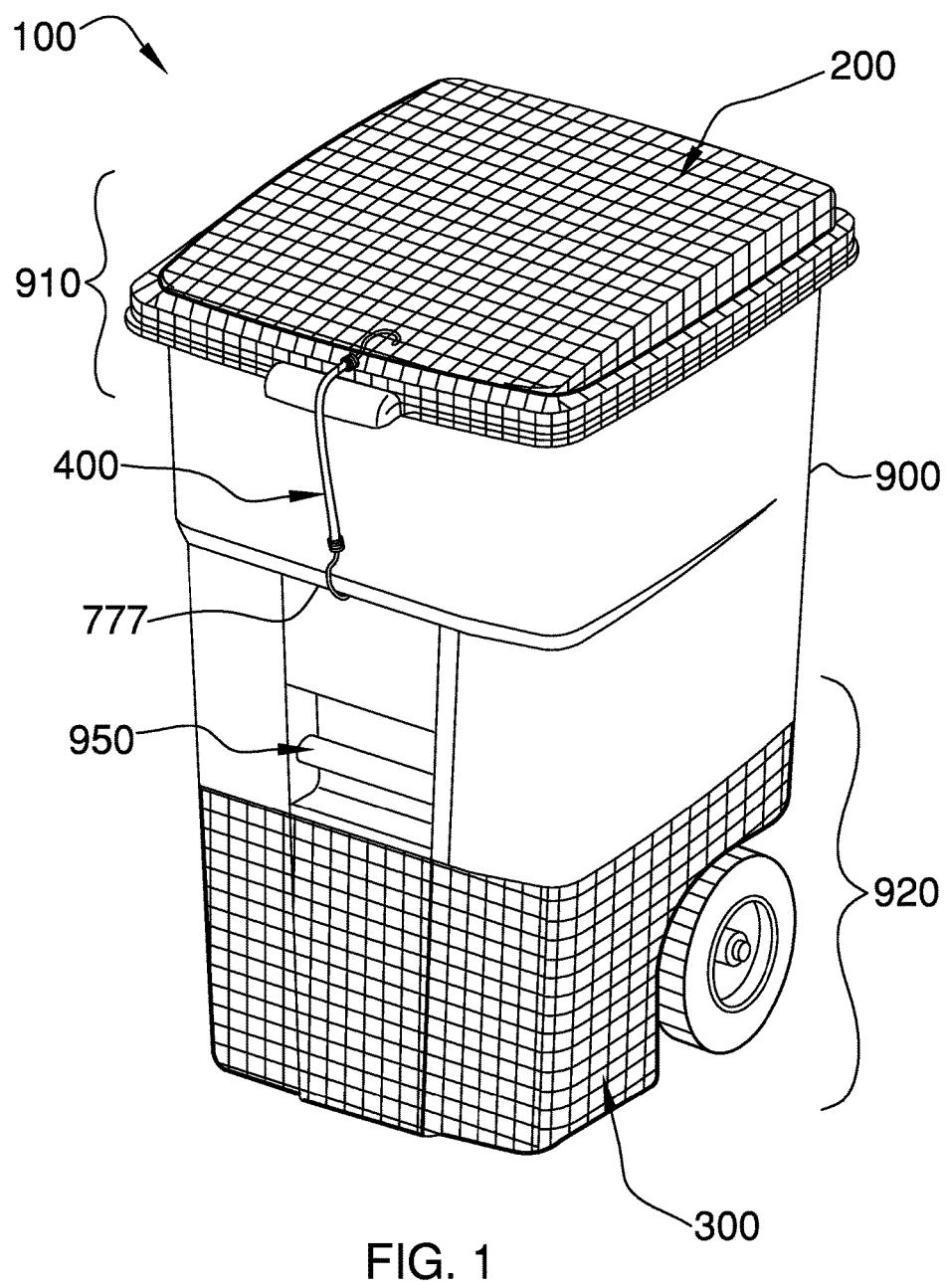
FIG. 1 is a perspective view showing the front of an embodiment of the disclosure.
Figure 2:
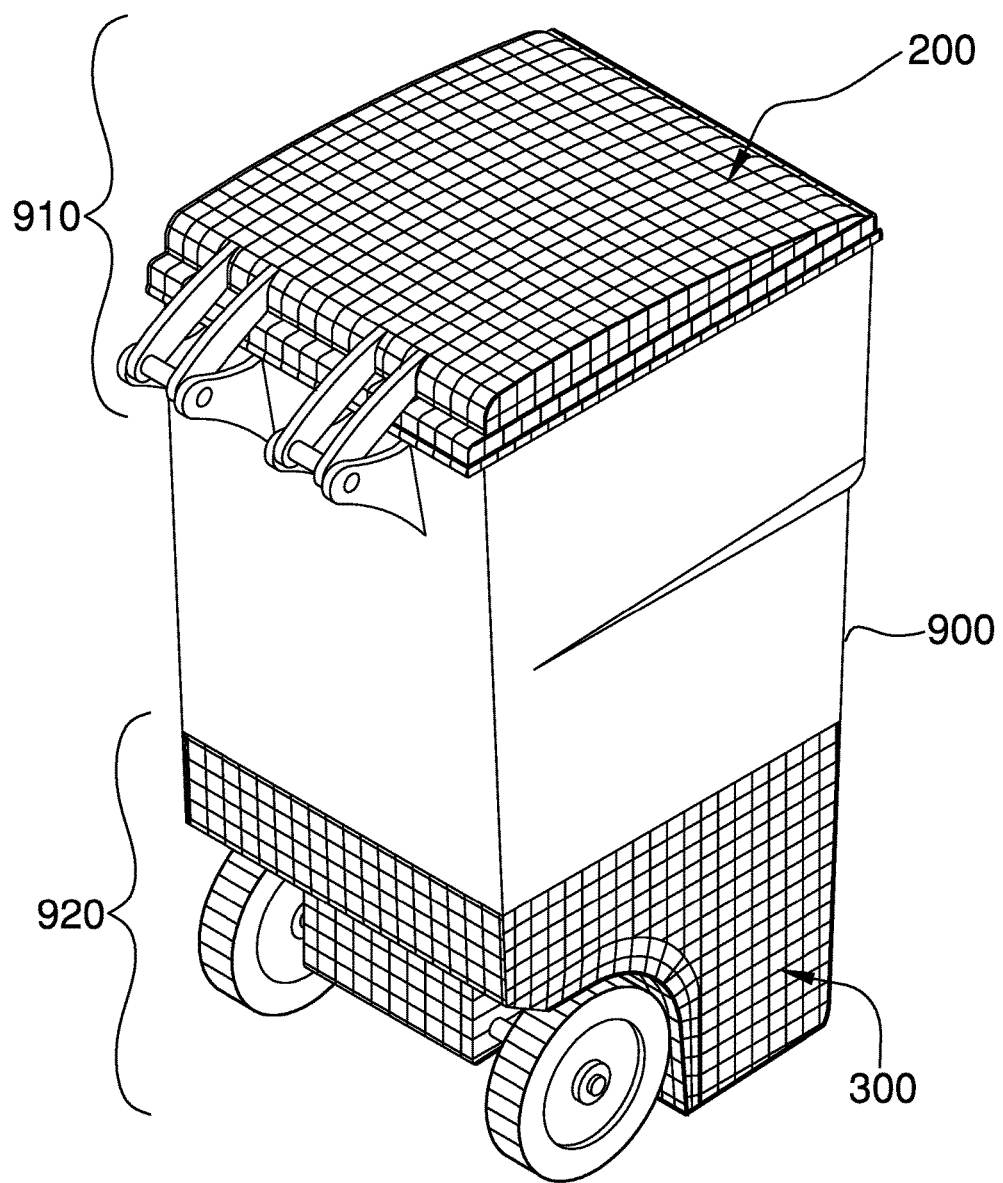
FIG. 2 is a perspective view showing the rear of an embodiment of the disclosure.
Figure 3:
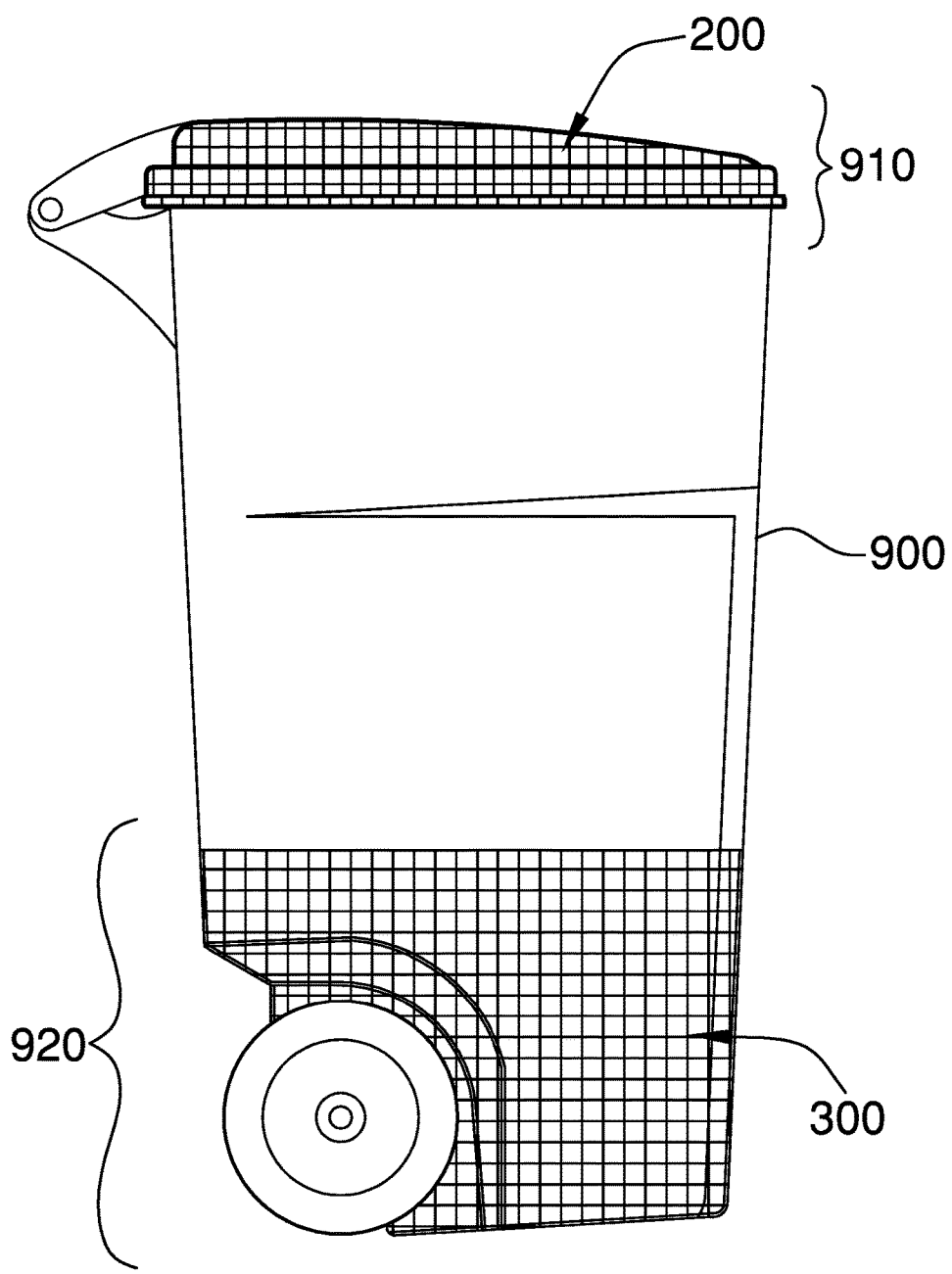
FIG. 3 is a side view of an embodiment of the disclosure.
Figure 4:
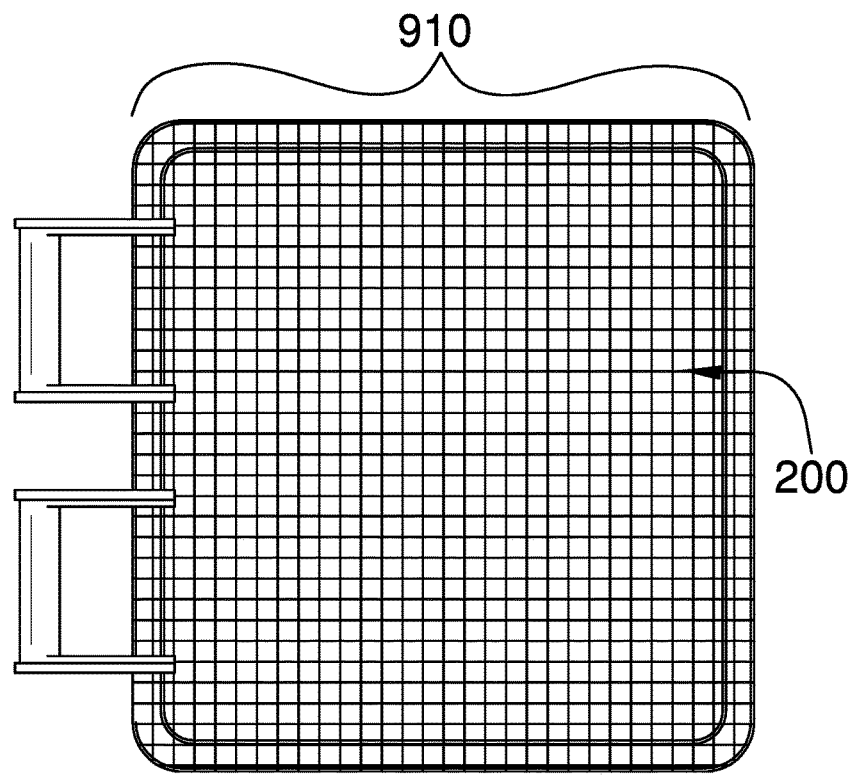
FIG. 4 is a top view of an embodiment of the disclosure.
Figure 5:
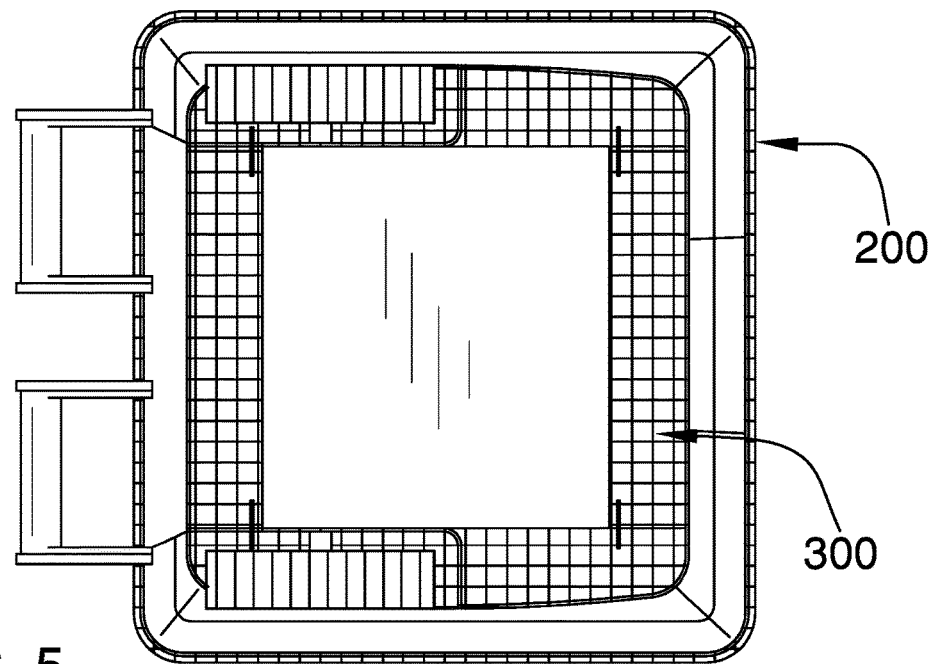
FIG. 5 is a bottom view of an embodiment of the disclosure.
Figure 6:
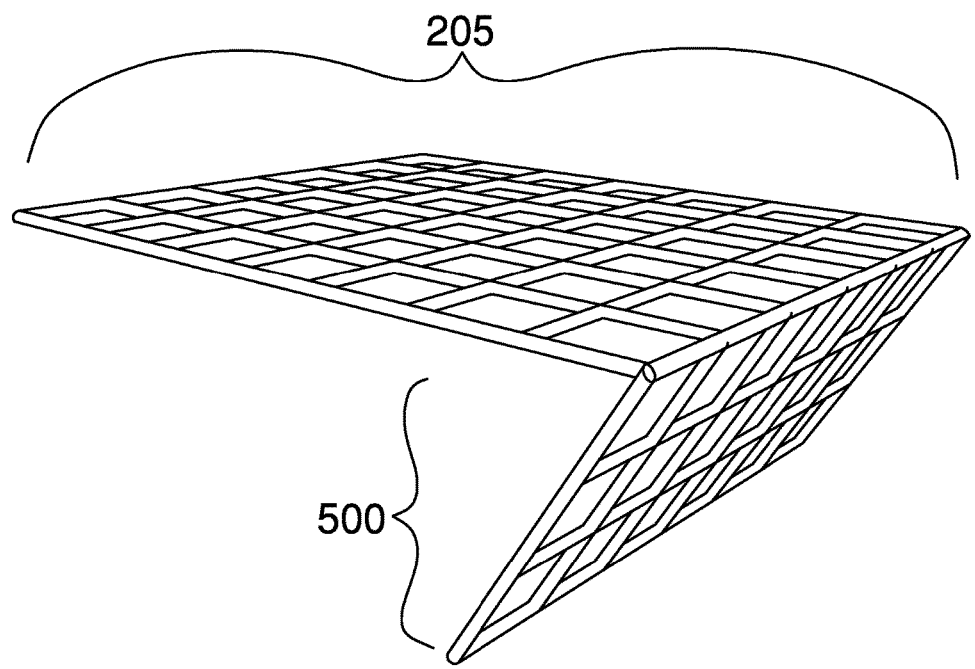
FIG. 6 is a detail view of a grasping edge according to an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 7.

The mesh lid system for a garbage can 100 (hereinafter invention) comprises a mesh lid cover 200 and one or more bungee cords. The mesh lid system for a garbage can 100 prevents a garbage can from being opened or gnawed on by squirrels, rodents, and other small animals (hereafter animals). The mesh lid system for a garbage can 100 is made to conform to the size and shape of a targeted garbage can 900. Multiple embodiments of the mesh lid system for a garbage can 100 may be needed to provide protection for multiple choices of the targeted garbage can 900, each embodiment conforming to the size, shape, and particulars of the targeted garbage can 900.

The mesh lid cover 200 is a protective cover for a garbage can lid 910. The mesh lid cover 200 presents a barrier between animals and the garbage can lid 910, thus making it difficult for animals to gnaw on the garbage can lid 910. Furthermore, the mesh lid cover 200 may be used in conjunction with the one or more bungee cords 400 to make it difficult to open the garbage can lid 910. The mesh lid cover 200 is made from a metal mesh material 205. The mesh lid cover 200 is shaped to match the garbage can lid 910 of the targeted garbage can 900. As a non-limiting example, the metal mesh material 205 may be pressed in a form causing it to take the shape of the form, said form having been designed to match the shape of the targeted garbage can 900. The mesh lid cover 200 covers the outside surface of the garbage can lid 910 except for hinges, handles, and other obstructions. The mesh lid cover 200 may comprise one or more grasping edges 500.

The one or more bungee cords 400 comprise stretch bands coupled to an "S"-hook at each end. In some embodiments, the one or more bungee cords 400 may be made from rubber or an elastic material. The one or more bungee cords 400 are used to prevent animals from opening the garbage can lid 910 while still allowing a human to easily open the garbage can lid 910 when necessary. The one or more bungee cords 400 may prevent opening of the garbage can lid 910 when they are attached between two points on the targeted garbage can 900 in such a way that opening the garbage can lid 910 would cause a stretching of the one or more bungee cords 400. As non-limiting examples, the one or more bungee cords 400 may be attached from a handle on one side of the targeted garbage can 900 to a handle on the opposing side of the targeted garbage can 900 (not shown in the figures), from the mesh lid cover 200 to a lifting bar 950 found on the targeted garbage can 900, or from the mesh lid cover 200 to a garbage can side lip 777 (as depicted in FIG. 1). When it is necessary for a human to open the garbage can lid 910, they may detach an "S"-hook on one end of the one or more bungee cords 400 and they may re-attach it when they have closed the garbage can lid 910.

The metal mesh material 205 comprises two or more horizontal mesh wires 210 oriented parallel to each other and two or more vertical mesh wires 220 oriented parallel to each other and oriented perpendicular to the two or more horizontal mesh wires 210. Where one of the two or more horizontal mesh wires 210 intersects one of the two or more vertical mesh wires 220 they are coupled to each other, either by a twisting together of the one of the two or more horizontal mesh wires 210 with the one of the two or more vertical mesh wires 220 or by a bonding together of the one of the two or more horizontal mesh wires 210 with the one of the two or more vertical mesh wires 220. As a non-limiting example, the bonding may take the form of a solder joint.

Figure 7:
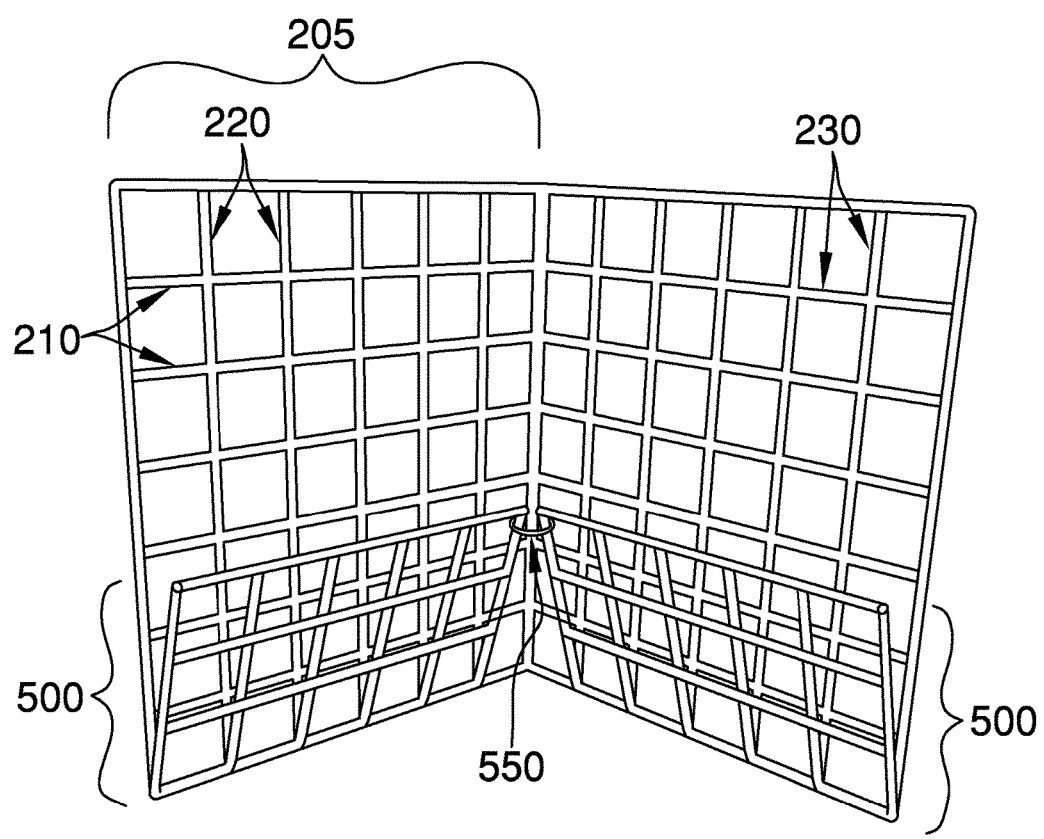
FIG. 7 is a detail view illustrating an area where two grasping edges meet at a corner according to an embodiment of the disclosure.

Each of the one or more grasping edges 500 are an extension of the metal mesh material 205 joined to the metal mesh material 205 along a single edge and bent along the single edge to an angle greater than 0 degrees and less than or equal to 180 degrees. When the mesh lid system for a garbage can 100 is installed on the targeted garbage can 900, the one or more grasping edges 500 may be temporarily bent to a lesser angle to allow the metal mesh material 205 to slip into place on the targeted garbage can 900 and then the one or more grasping edges 500 may be returned to their original bend angle so that the one or more grasping edges 500 now wrap at least partially around the targeted garbage can 900. Where two of the one or more grasping edges 500 meet at a corner, they may be joined to each other using a coupling 550 to strengthen the mesh lid system for a garbage can 100. The coupling 550 between two of the one or more grasping edges 500 may take a number of forms. As non-limiting examples, the coupling 550 may be formed by twisting individual mesh wires 230 attached to each of the one or more grasping edges 500 together or by placing one or more nylon cable ties 960 around both of the one or more grasping edges 500 (as illustrated in FIG. 7).

In some embodiments, the mesh lid system for a garbage can 100 further comprises the mesh bottom cover 300. The mesh bottom cover 300 prevents animals from gnawing holes in a bottom portion of the garbage can 920 by covering it with the metal mesh material 205. Like the mesh lid cover 200, the mesh bottom cover 300 is formed to match the targeted garbage can 900. The mesh bottom cover 300 may be held in place on the targeted garbage can 900 by using the one or more grasping edges 500 of the mesh bottom cover 300 to grasp ridges and other physical features of the targeted garbage can 900, by using mechanical fasteners, or by a combination thereof. As non-limiting examples, mechanical fasteners may include screws, bolts, nuts, washers, pop rivets, and other types of fasteners.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mesh lid system for a garbage can comprising:
    a mesh lid cover and one or more bungee cords;
    wherein the mesh lid system for a garbage can is adapted to prevent a targeted garbage can from being opened or gnawed on by animals;
    wherein the mesh lid system for a garbage can conforms to the size and shape of the targeted garbage can;
    wherein the mesh lid cover is made from a metal mesh material;
    wherein the mesh lid cover is a protective cover for a garbage can lid;
    wherein the mesh lid cover is adapted to present a barrier between animals and the garbage can lid;
    wherein the mesh lid cover is shaped to match the garbage can lid of the targeted garbage can;
    wherein the mesh lid cover covers the outside surface of the garbage can lid except for hinges and handles;
    wherein the mesh lid cover comprises one or more grasping edges;
    wherein the one or more bungee cords comprise stretch bands coupled to an "S"-hook at each end;
    wherein the one or more bungee cords prevent opening of the garbage can lid by attaching between the mesh lid cover and a mesh bottom cover.

2. The mesh lid system for a garbage can according to claim 1
    wherein the one or more bungee cords prevent opening of the garbage can lid by attaching between the mesh lid cover and a garbage can side lip of said garbage can.

3. The mesh lid system for a garbage can according to claim 1
    wherein the metal mesh material comprises two or more horizontal mesh wires and two or more vertical mesh wires;
    wherein the two or more horizontal mesh wires are oriented parallel to each other;
    wherein the two or more vertical mesh wires are oriented parallel to each other;

wherein the two or more vertical mesh wires are oriented perpendicular to the two or more horizontal mesh wires;

wherein one of the two or more horizontal mesh wires intersects one of the two or more vertical mesh wires they are coupled to each other.

4. The mesh lid system for a garbage can according to claim 3 wherein the coupling of the one of the two or more horizontal mesh wires with the one of the two or more vertical mesh wires is a solder joint.

5. The mesh lid system for a garbage can according to claim 3 wherein the one or more grasping edges are an extension of the metal mesh material;

wherein the one or more grasping edges are joined to the metal mesh material along a single edge;

wherein the one or more grasping edges are bent along the single edge to an angle greater than 0 degrees and less than or equal to 180 degrees.

6. The mesh lid system for a garbage can according to claim 5 wherein the one or more grasping edges are temporarily bent to a lesser angle to allow the metal mesh material to slip into place on the targeted garbage can;

wherein the one or more grasping edges are returned to their original bend angle after being installed so that the one or more grasping edges wrap at least partially around the targeted garbage can.

7. The mesh lid system for a garbage can according to claim 6 wherein where two of the one or more grasping edges meet at a corner, they are joined to each other using a coupling to strengthen the mesh lid system for a garbage can.

8. The mesh lid system for a garbage can according to claim 7 further comprising the mesh bottom cover;

wherein the mesh bottom cover is adapted to prevent animals from gnawing holes in a bottom portion of the garbage;

wherein the mesh bottom covers a bottom portion of the garbage can with the metal mesh material;

wherein the mesh bottom cover is formed to match the targeted garbage can.

9. The mesh lid system for a garbage can according to claim 8 wherein the mesh bottom cover is held in place on the targeted garbage can using a combination of the one or more grasping edges and mechanical fasteners.

* * * * *